United States Patent
Roberts et al.

(10) Patent No.: US 11,473,663 B1
(45) Date of Patent: Oct. 18, 2022

(54) CONTINUOUS FIBER COMPOSITE POWER TRANSFER STRUCTURES

(71) Applicant: United States of America as represented by the Administrator of NASA, Washington, DC (US)

(72) Inventors: Gary D. Roberts, Wadsworth, OH (US); Robert F. Handschuh, North Olmsted, OH (US); Kelsen E. LaBerge, Lakewood, OH (US); Joel P. Johnston, Cleveland, OH (US); Sandi G. Miller, Northfield, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 354 days.

(21) Appl. No.: 16/283,069

(22) Filed: Feb. 22, 2019

Related U.S. Application Data

(60) Provisional application No. 62/634,448, filed on Feb. 23, 2018.

(51) Int. Cl.
  *F16H 55/06* (2006.01)
  *F16H 55/17* (2006.01)
  *B32B 5/26* (2006.01)

(52) U.S. Cl.
  CPC .............. *F16H 55/06* (2013.01); *B32B 5/26* (2013.01); *F16H 55/17* (2013.01)

(58) Field of Classification Search
  CPC .... F16H 55/06; F16H 55/17; F16H 2055/065; B32B 5/26
  See application file for complete search history.

(56) References Cited

U.S. PATENT DOCUMENTS

| 1,501,026 A | 7/1924 | Guay |
| 1,501,027 A | 7/1924 | Guay |
| 1,501,028 A | 7/1924 | Guay |
| RE16,161 E | 9/1925 | Talley |

(Continued)

OTHER PUBLICATIONS

Contract NNX13CC09C (SBIR 2011-II), "Braided Composite Technologies for Rotorcraft Structures", A&P Technology, Cincinnati, OH.

(Continued)

*Primary Examiner* — Victor L MacArthur
*Assistant Examiner* — Gregory T Prather
(74) *Attorney, Agent, or Firm* — Robert H. Earp, III; William M. Johnson; Helen M. Gaius

(57) ABSTRACT

A gear includes a steel rim having an inner circumferential surface a composite gear body attached thereto. The composite gear body includes an opening in a central region thereof. A first continuous fiber composite layer extends from a first point on an outer circumferential edge of the composite gear body to a second point on the outer circumferential edge. A second continuous fiber layer extends from the first point to the second point. The composite gear body also includes a filler layer disposed between the first and second continuous fiber layers, the filler layer extending within an inner region of the composite gear body. The inner region extends radially between the opening and a boundary inward of the inner circumferential surface such that the composite gear body is thicker within the inner region.

11 Claims, 7 Drawing Sheets

(56) References Cited

U.S. PATENT DOCUMENTS

| | | | |
|---|---|---|---|
| 1,601,913 A | 10/1926 | Guay | |
| 1,638,012 A | 8/1927 | Hoof | |
| 1,761,114 A | 6/1930 | Frederick | |
| 1,778,789 A | 10/1930 | Benge | |
| 1,813,819 A | 7/1931 | Ross | |
| 1,824,825 A | 9/1931 | Mains | |
| 1,891,937 A * | 12/1932 | Mansur | F16H 55/06 74/445 |
| 1,943,024 A | 1/1934 | Lytle | |
| 1,981,782 A | 11/1934 | D'Aubigne | |
| 1,984,113 A | 12/1934 | Wesley | |
| 2,000,769 A | 5/1935 | Mansur | |
| 2,050,916 A | 8/1936 | Benge et al. | |
| 2,064,144 A | 12/1936 | Benge | |
| 2,064,723 A | 12/1936 | Benge | |
| 2,111,590 A | 3/1938 | Hoof | |
| 2,229,982 A | 1/1941 | Mansur et al. | |
| 2,231,427 A | 2/1941 | Larsh et al. | |
| 2,307,129 A | 1/1943 | Hines et al. | |
| 2,460,630 A | 2/1949 | Fawick | |
| 2,720,119 A | 10/1955 | Sherman | |
| 2,748,618 A | 6/1956 | Lee | |
| 2,839,943 A | 6/1958 | Hausmann et al. | |
| 2,859,635 A | 11/1958 | Lee | |
| 3,199,364 A | 8/1965 | Dew | |
| 3,200,665 A | 8/1965 | Martin | |
| 3,257,860 A | 6/1966 | Runde et al. | |
| 3,307,419 A | 3/1967 | Brickett et al. | |
| 3,610,066 A | 10/1971 | Rychlik | |
| 4,078,445 A | 3/1978 | Kiser, Jr. | |
| 4,174,643 A | 11/1979 | Tsukamoto | |
| 4,302,986 A | 12/1981 | Shepherd | |
| 4,326,849 A | 4/1982 | Van Zijderveld | |
| 4,674,351 A | 6/1987 | Byrd | |
| 4,722,722 A | 2/1988 | Rampe | |
| 4,946,427 A | 8/1990 | Rampe | |
| 4,993,651 A | 2/1991 | Ohno et al. | |
| 5,074,828 A | 12/1991 | Ellis | |
| 5,285,699 A | 2/1994 | Walls et al. | |
| 5,307,705 A | 5/1994 | Fenelon | |
| 5,452,622 A | 9/1995 | Fenelon | |
| 5,852,951 A | 12/1998 | Santi | |
| 6,053,060 A | 4/2000 | Tumberlinson et al. | |
| 6,755,094 B2 | 6/2004 | Rehle et al. | |
| 6,875,113 B2 | 4/2005 | Nichols | |
| 7,197,959 B2 | 4/2007 | Crissy | |
| 7,503,864 B2 | 3/2009 | Nonoshita et al. | |
| 8,397,602 B2 | 3/2013 | Christenson et al. | |
| 8,585,934 B2 | 11/2013 | Shah et al. | |
| 8,690,546 B2 | 4/2014 | Standke | |
| 9,296,157 B1 * | 3/2016 | Handschuh | B29C 70/84 |
| 2011/0024694 A1 | 2/2011 | Shah et al. | |
| 2011/0250070 A1 | 10/2011 | Demtroder | |
| 2017/0321793 A1 * | 11/2017 | Wu | F16H 55/30 |
| 2019/0048984 A1 * | 2/2019 | Anderson | F16H 55/17 |

OTHER PUBLICATIONS

Roberts, Handschuh, and Kohlman, "A hybrid composite/metal gear concept for rotorcraft drive systems", Carbon Fiber 2013 Conference, Knoxville, TN, Dec. 9-12, 2013.

Cross, Hayes, Holemans, Armstrong, and Petrovich, "Design, Fabrication, and Testing of a Composite Drive Shaft with an Integral Misalignment Feature", American Helicopter Society 67th Annual Forum, Virginia Beach, VA, May 3-5, 2011.

* cited by examiner

| Property | Steel (Medium Carbon) | Continuous Fiber Composite | Rigid Matrix (resin) | Carbon Fiber | Glass Fiber | Aramid Fiber |
|---|---|---|---|---|---|---|
| Density, g/cm³ | 7.85 | 1.4 | 1.2 | 1.80 | 2.49 | 1.44 |
| Glass transition temperature, °C | N/A | 100-180 | 100-180 | N/A | N/A | N/A |
| Young's modulus, MPa | 200,000 | 47,000 | 2,700 | 230,000 | 72,000 | 130,000 |
| Specific modulus (modulus/density) | 25,500 | 33,600 | 2,300 | 128,000 | 28,900 | 90,300 |
| Tensile strength, MPa | 745 470 (yield) | 814 | 70 | 4,900 | 4,600 | 2,800 |
| Specific strength (strength/density) | 0.095 | 0.58 | 0.058 | 2.72 | 1.85 | 1.94 |

FIG. 1

CONTINUOUS FIBER COMPOSITE POWER TRANSFER STRUCTURES

CROSS-REFERENCE TO RELATED APPLICATIONS

This application claims the benefit of U.S. Provisional Patent Application Ser. No. 62/634,448 entitled "CONTINUOUS FIBER COMPOSITE POWER TRANSFER STRUCTURES," filed on Feb. 23, 2018, the entirety of which is incorporated by reference herein.

ORIGIN OF DISCLOSURE

The present disclosure is based on work performed by employees of the United States Government and may be manufactured and used by or for the Government for Government purposes without the payment of any royalties thereon or therefore.

TECHNICAL FIELD

The present disclosure relates to power transfer structures. More particularly, the present disclosure is directed to power transfer structures such as gears constructed of both a metallic material and a fiber composite material.

BACKGROUND

Rotating structures are used to transfer mechanical power from a power source to a structure that performs work. Using a rotorcraft as an example, power generated by an engine is transferred through a combination of rotating shafts and gears to a set of rotor blades that perform work to enable flight. In this example, the power source could be an internal combustion engine, a gas turbine engine, an electric motor, or other device that outputs power through a rotating shaft. This rotary power is transferred through a drive system to a rotor shaft attached to rotor blades that perform work to provide lift and forward flight. For rotorcraft and other flight vehicles, lightweight design is an important consideration, so drive systems are required to operate at high power density (e.g., power/weight).

Given this, gears used in rotorcraft applications are designed such that the minimum weight is attained without sacrificing reliability or safety. Since the drive system is an appreciable percentage of the overall rotorcraft vehicle weight (about 10%), many approaches have been applied to improve the power to weight ratio of these components. One proposed method—described in U.S. Pat. No. 9,296,157, hereby incorporated by reference in its entirety—for reducing gear weight developed by Applicants of the present disclosure is through replacement of gear web portions (e.g., the portion of the gear between the rim and a central hub) with lightweight carbon fiber composite material.

Specialized drive systems require power transfer structures (e.g., gears) having complex shapes specifically designed to minimize weight and maximize power density in specific contexts. Accordingly, a composite power transfer structure allowing for flexibility in shape and form of the structure while still incorporating composite material may be beneficial.

SUMMARY

One embodiment relates to a gear. The gear includes a steel rim having an inner circumferential surface; and a composite gear body attached to the inner circumferential surface. The composite gear body includes an opening in a central region thereof. The composite gear body includes a first continuous fiber composite layer extending from a first point on an outer circumferential edge of the composite gear body to a second point on the outer circumferential edge. The first and second points are on opposing sides of a central axis of the composite gear body. The composite gear body also includes a second continuous fiber layer extending from the first point to the second point. The composite gear body also includes a filler layer disposed between the first and second continuous fiber layers, the filler layer extending within an inner region of the composite gear body. The inner region extends radially between the opening and a boundary inward of the inner circumferential surface such that the composite gear body is thicker within the inner region.

Another embodiment is directed to a power transfer structure. The power transfer structure includes a steel rim disposed in a plane and a continuous fiber body having a first end and a second end. The continuous fiber includes a constant diameter portion extending from the first end and around a central axis, a variable radius portion extending from the constant diameter portion away from the first end, and a flange portion. The flange portion extends from the variable radius portion at the second end. The second end is disposed proximate to the plane and the flange portion includes mounting apertures for attaching the rim to the continuous fiber body. At least a portion of the variable radius portion and the entirety of the constant diameter portion are disposed outside of the plane.

Another embodiment relates to a power transfer assembly. The power transfer assembly includes a central plate having an outer circumferential surface. The power transfer assembly also includes a gear rim attached to the outer circumferential surface. The power transfer assembly also includes a first power transfer structure disposed on a first side of the central plate. The first power transfer structure includes a first continuous fiber composite layer directly contacting the central plate. The first power transfer structure also includes a second continuous fiber composite layer disposed on the first continuous fiber composite layer. The first power transfer structure also includes a first filler layer disposed between the first and second continuous fiber composite layers, wherein the filler layer extends within an inner region of the first power transfer structure such that the first power transfer structure is thicker within the inner region. The power transfer assembly also includes a second power structure disposed on a second side of the central plate. The second power transfer structure includes a continuous fiber body having a first end and a second end. The continuous fiber body includes a constant diameter portion extending from the first end and around a central axis. The continuous fiber body also includes a variable radius portion extending from the constant diameter portion away from the first end. The continuous fiber body also includes a flange portion extending from the variable radius portion at the second end. The flange portion includes mounting apertures for attachment to the central plate.

BRIEF DESCRIPTION OF THE DRAWINGS

In order that the advantages of certain embodiments will be readily understood, a more particular description of the invention briefly described above will be rendered by reference to example embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a chart showing the properties of various materials;

DETAILED DESCRIPTION

Figure 2:
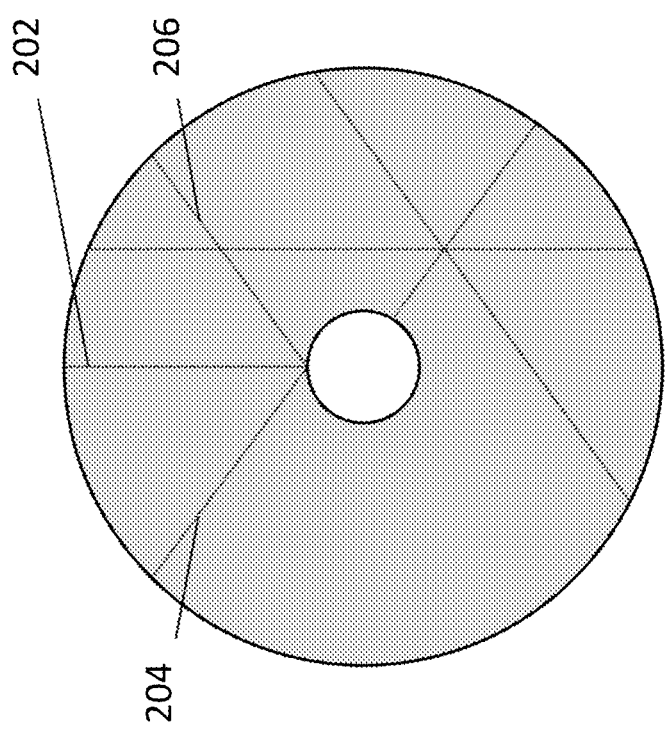
FIG. 2 is an illustrative view of a portion of a gear, according to an example embodiment.

It will be readily understood that the components of various embodiments, as generally described and illustrated in the Figures herein, may be arranged and designed in a wide variety of different configurations. Thus, the detailed description of the embodiments of the present invention, as represented in the attached Figures, is not intended to limit the scope of the invention as claimed, but is merely representative of selected embodiments of the present disclosure.

Referring generally to the Figures, described herein are continuous fiber composite power transfer structures. The power transfer structures described herein provide both weight-saving advantages and additional flexibility over the methods described in U.S. Pat. No. 9,296,157 ("the '157 Patent"). Composite gear assemblies disclosed in the '157 Patent generally include a steel rim and a steel web connected to one another with a composite material. In one aspect, the power transfer structures described herein provide weight-saving advantages over those disclosed in the '157 Patent by also constructing the central hub of a composite material.

The central hub of a rotational structure may be subject to additional stresses than the rim. As such, greater strength may be required towards the central hub in order to maintain the desired alignment of various features of the rotational structure. In this regard, the present disclosure includes a substantially-planar rotational structure that includes an inner portion and an outer portion, with the inner portion being substantially thicker than the outer portion. At least the inner portion is constructed of multiple layers of continuous fiber composite material. Beneficially, the continuous fiber material (e.g., through continuous, intact fibers extending between outer circumferential edges of the material) provides a primary load path for the power transfer structures to mitigate the detrimental effects of fiber termination points. Between these continuous fiber composite layers are varying amounts of filler materials. For example, in one embodiment, greater amounts of filler material are disposed between the continuous fiber composite layers at the inner portion than at the outer portion. The shape of the filler material can be optimized to create an inner portion having a desired thickness, strength and shape. This approach enables the shape of the rotational structure to be individually tailored to particular applications.

Beneficially, the utilization of continuous fiber layers preserves the fiber continuity of the layers of composite material and creates a primary load path between the load input and output locations of a power transfer structure (these layers are referred to as the "intact" continuous fiber layers herein). Load transfer through intact continuous fibers provides greater strength and resistance to high cycle fatigue compared to load transfer through short fiber layers or through continuous fiber plies that have been cut.

In various embodiments, the intact continuous fiber layers are separated by cut plies or other filler materials in order to provide thickness change in the structure and to control the location of the intact continuous fiber layers relative to the neutral axis of the structure. Fabrication of the structure is achieved through forming of flat fabric sheets or fabric prepreg (e.g., fabric pre-impregnated with polymer resin) into a desired shape before curing of the composite material or by preforming a desired shape prior to infusion of a polymer resin. This design approach has several advantages. The strength and stiffness of the structure can be controlled by the properties of the fibers used, the number of fiber layers used, and the location of the fibers relative to the neutral axis of the structure. High cycle fatigue resistance is achieved by using the intact continuous fibers as the primary load path and minimizing curvature of the continuous fibers using filler materials.

In another aspect, the approaches described herein, can also be applied to replace the metal gear body for gears that extend out of the plane of the gear rim as a solid of revolution around the axis of the gear (similar to a truncated conical shape).

In order to achieve a lighter weight design compared to conventional steel components, the composite material preferably possesses higher specific strength (strength/density) and higher specific stiffness (stiffness/density) compared to conventional steel gear alloys. In addition, the structure made using the composite material is preferably resistant to property degradation and failure during high cycle fatigue loading. For structures used inside of a gearbox, the composite material preferably survives exposure to high temperature oil without degradation of strength and stiffness.

For some gear applications, precise circumferential location of gear teeth relative to the hub is required. To meet this requirement, the composite material preferably remains rigid and elastic at the maximum operating load and temperature conditions so that processes such as creep and plastic deformation do not allow rotation of the gear teeth relative to the hub greater than the rotation allowed for an all steel gear design. For these applications, fiber reinforcement material in the power transfer structures is preferably limited to intact continuous fibers (rather than short discontinuous fibers) and the matrix material in the composite is preferably limited to polymeric materials that will not exhibit creep at the highest operating load/temperature (such as thermoset resins having a glass transition temperature above the maximum operating temperature). Thermoplastic resins could be an alternative to thermoset resins if the structure can be designed to have acceptable levels of creep and plastic deformation under the operating conditions of the structure.

The intact continuous fiber composite material described herein is used to provide the strength, stiffness, and fatigue resistance needed for the primary load path in the power transfer structure. Other materials (such as cut composite plies, bulk molding compounds, thermoplastic resins, structural foam core, and elastomers) could be used outside of the primary load path to provide other benefits (such as thickness build-up, lighter weight, lower cost, or vibration damping).

An example of continuous carbon fiber composite properties compared to steel properties is shown in FIG. 1 along with properties of a suitable rigid epoxy thermoset matrix material and the properties of three types of continuous fiber. Continuous fiber composites can have a range of properties depending on the fiber and matrix properties, the volume fraction of fibers, and the fiber architecture. Properties for the continuous fiber composite in FIG. 1 are representative of a composite material made with a standard modulus carbon fiber (e.g. Toray® T700) and epoxy matrix with a fiber volume fraction of 0.56 and a quasi-isotropic (0/+60/−60) braid architecture. The braided architecture is chosen to provide the ability to create axi-symmetric contoured shapes without cutting of fibers and to allow forming of the material during composite fabrication. Other architectures with these shaping and forming characteristics could also be used.

Such composite material may be used to construct various types of rotational power transfer structures. The present disclosure provides three illustrative structures. First, a substantially-planar gear having a single hub and a single rim is disclosed. In this embodiment, the hub and web sections of the gear are made as an integrated structure having a decrease in thickness from the hub inner diameter to the web outer diameter. The thickness variation is accomplished using multiple layers of continuous fiber composite material formed to specific shapes and separated by filler materials. Second, a gear having an extended gear body in the axial direction rather than a simple planar structure is disclosed. The gear body is made using multiple layers of continuous fiber composite material in the shape of a solid of revolution. The third embodiment combines aspects of the first and second embodiments.

First Embodiment

FIG. 2 shows an illustration of a continuous fiber layer of a substantially planar gear body 200, according to an example embodiment. The gear body 200 may be constructed of multiple layers of continuous fiber material. As used herein, the term "gear body" refers to a combination of a central hub and web of a gear and excludes an outer rim including the gear's teeth. Gear body 200 is substantially-annular shaped and of a variable thickness. Gear body 200 is constructed using a formable continuous fiber composite material in discrete intact layers separated by filler materials. As an example, a (0/+60/−60) triaxial braid architecture could be used for the intact continuous fiber composite material. FIG. 2 shows one intact continuous fiber, braided composite layer and the dashed lines represent several selected fiber bundles.

As shown, the gear body includes, in addition to other fiber bundles, continuous fibers 202, 204, and 206. The continuous fibers lie in 0° (202), −60° (204), and +60° (206) directions. Each individual fiber within the layer terminates on either the inside diameter or outside diameter of the annular ring. The advantage of this approach is that the load path along a fiber connecting any two edge points of the annular ring is continuous with no fiber terminations within the annular ring that could act as weak points in the structure.

Figure 3:
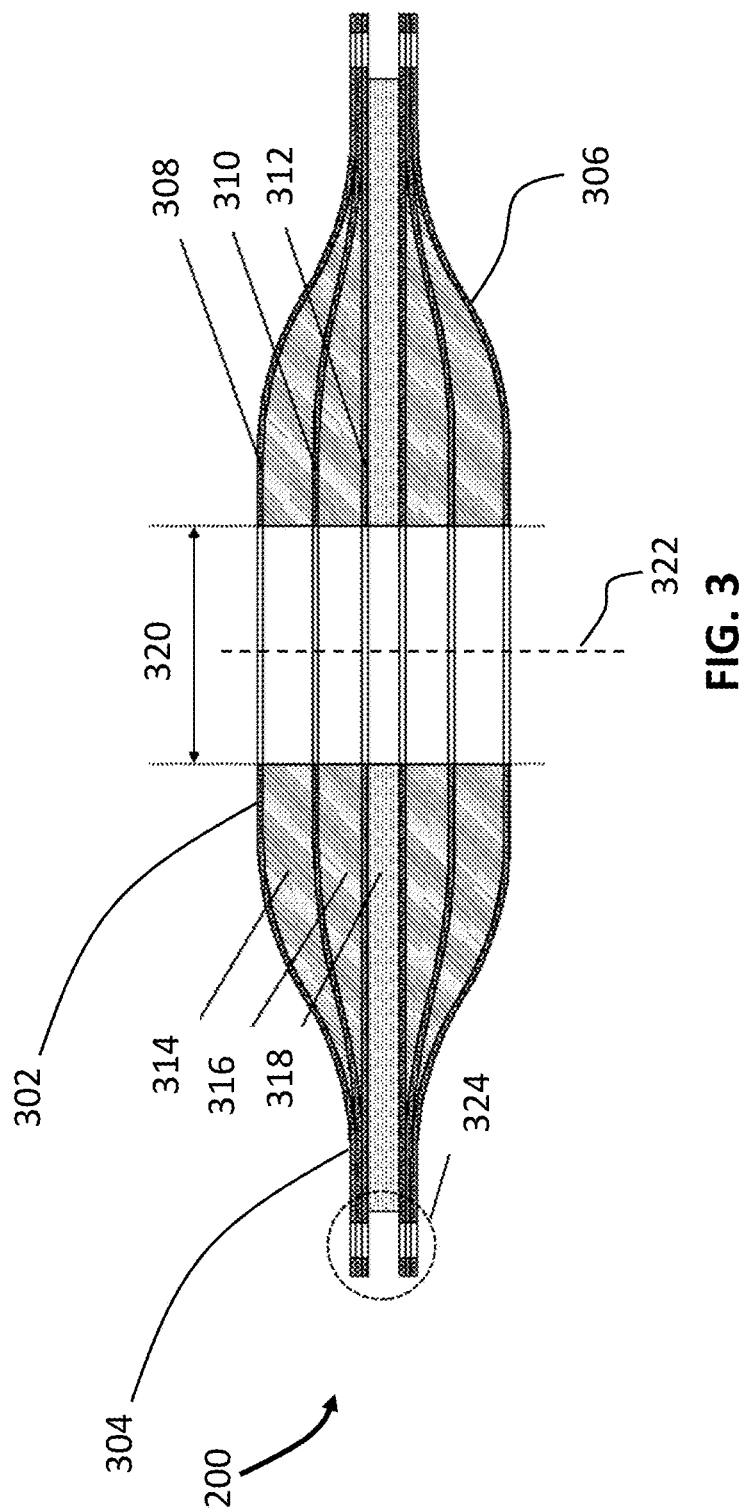
FIG. 3 is a cross sectional view a portion of a gear, according to an example embodiment.

FIG. 3 shows a cross-sectional view of the gear body 200. As shown, gear body 200 includes an inner portion 302 and an outer portion 304 that is substantially thinner than the inner portion 302. In an embodiment, both the outer portion 304 and the inner portion 302 are substantially annular-shaped. In the example shown, a transition region 306 separates the outer portion 304 (or "outer region 304") from the inner portion 302. In some embodiments, the inner portion 302 (or "inner region 302") includes the transition region 306 such that the inner portion 302 axially overlaps with an entirety of the regions including filler layers 314 and 316.

The inner portion 302 and outer portion 304 are each constructed of intact continuous fiber composite layers 308, 310, and 312 on an upper side and an additional set of intact continuous fiber composite layers on a lower side (e.g., below a central spacer layer, which is flat spacer layer 318 in the shown embodiment). The additional set of continuous fiber composite layers may mirror construction of the intact continuous fiber composite layers 308, 310, and 312 in some embodiments. Alternatively, in other embodiments, the continuous fiber composite layers may vary in structure on either side of a thickness center of the power transfer structure.

In the example shown, in the inner portion 302, intact continuous fiber layers 308 and 310 each extend perpendicular to (or substantially perpendicular to, or at angles within 10 degrees of perpendicular to in other embodiments) a central axis 322 of the gear body 200. Intact continuous fiber layers 308 and 310 also extend perpendicular to the central axis 322 within the outer portion 304. In the transition region 306, intact continuous fiber layers 308 and 310 extend at nonzero angles (e.g., between 10 and 70 degrees, or under 45 degrees) to the central axis 322 so as to bend towards a thickness center of the gear body 200. The intact continuous fiber composite layer 312 is substantially planar or flat throughout the gear body 200. In the inner portion 302, the continuous fiber composite layers 308, 310, and 312 are separated by contoured filler regions 314 and 316, respectively. A flat spacer layer 318 separates the continuous fiber composite layers 308, 310, and 312 from the additional set of continuous fiber composite layers on the lower side of the gear body 200. The contoured filler regions 314 and 316 enable the greater thickness of the inner region 302 to have more material where stresses are concentrated near the loading input of an incorporating gear.

Gear body 200 also includes an attachment feature 324 at the outer circumferential edge of the outer portion 304 for attaching a rim (e.g., including teeth) thereto. An additional attachment feature may be included at an inner aperture 320 within the gear body 200 to allow for attachment of a shaft. Attachment feature 324 may include any suitable mechanism. For example, in one embodiment, attachment feature 324 may include a series of holes in intact continuous fiber composite layers 308, 310, and 312 enabling a suitable fasteners to be used to attach a rim. In the example shown, the composite layers 308, 310, and 312 extend beyond (or have greater diameters than) the flat spacer layer 318 and the holes may be placed in overhanging portions of the composite layers 308, 310, and 312 such that the fasteners may not extend through the flat spacer layer 318. This may be beneficial to prevent stresses from being placed on the flat spacer layer 318 via the fasteners.

In the gear body 200, the primary load path between the inner and outer diameters of the gear body 200 is through the intact continuous fiber composite layers (e.g., 308, 312, and 312). The materials in the filler regions (314 and 316) are selected based on weight, structural requirements, manufacturability, cost, and other requirements. Examples include, but are not limited to, structural foam for light weight, bulk molding compound for ease of manufacturing, and cut layers of continuous fiber composite for maximum stiffness. Spacer layer 318 provides several functions. If made of intact continuous fiber composite material, for example, spacer layer 318 provides additional load capacity in parallel with the primary load path. Also in the shown example, the thickness of the spacer layer 318 determines the spacing at the outer diameter for a fastened attachment at the attachment feature 324. In addition, the inner and outer diameters of layer 318 can be shaped (e.g. with lobes or polygons) to provide mechanical interlocks at the outer diameter and the inner diameter, similar to that described in the '157 Patent.

In a preferred embodiment, the gear body 200 is used as the hub and web portions of a gear. The intact continuous fiber layers 308, 310, and 312 are made using a (0, +60/−60) triaxial braided prepreg material capable of conforming to the variable thickness shape without wrinkling. The flat spacer layer 318 is made using the same material as the layers 308, 310, and 312 with a thickness equal to that of the internal flange of a steel gear rim, so that the gear rim can be fastened to the attachment feature 324 of the power transfer structure. The inside diameter 320 of the power transfer structure is designed to be attached to a shaft through a keyway, mechanical interlock, or spline.

Figure 4:
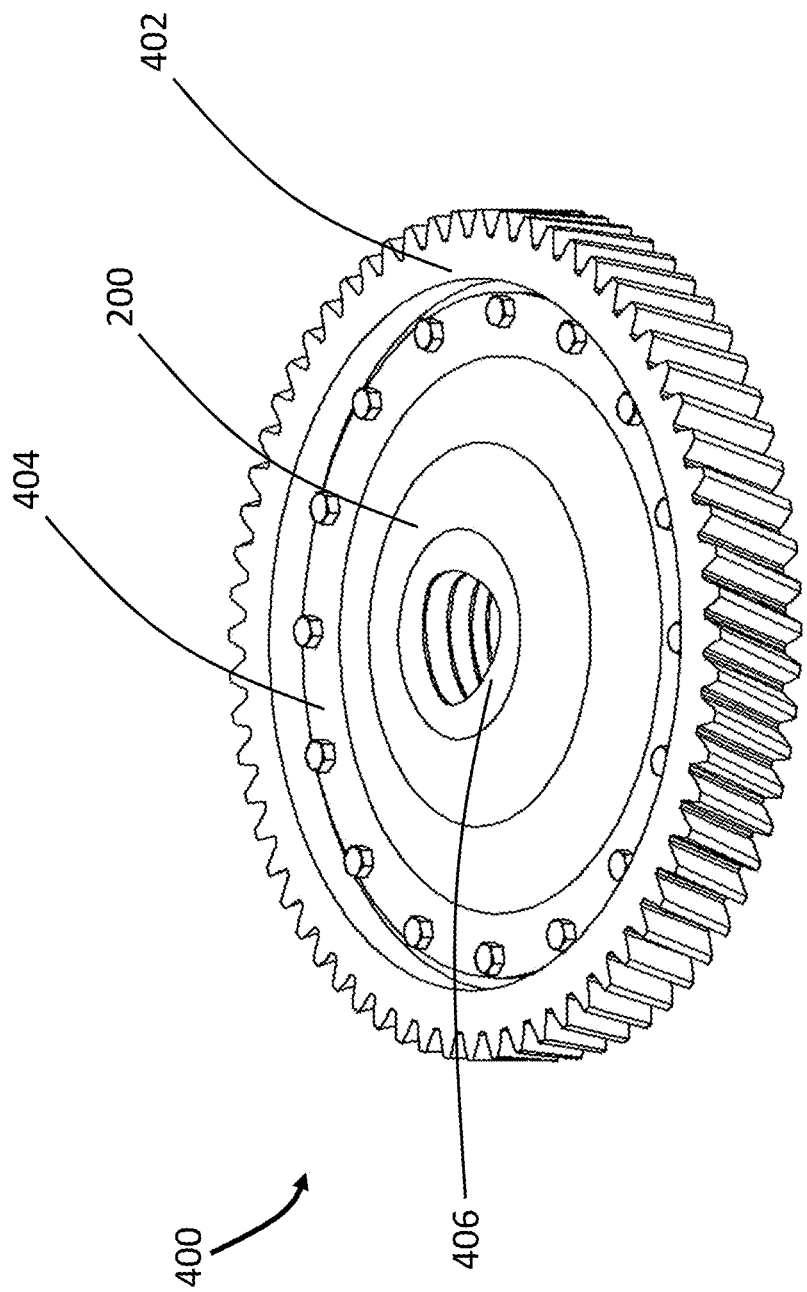
FIG. 4 is a perspective view of a gear, according to example embodiment.

Referring now to FIG. 4, a gear 400 incorporating gear body 200 is shown, according to an example embodiment. As shown, a rim 402 is attached to the gear body 200 (e.g., at the attachment feature 324) via an interlock feature 404. The interlock feature 404 may be constructed in a manner similar to that described in the '157 Patent. A shaft attaching mechanism 406 is also attached to the gear body 200 (e.g., via an attachment feature at the inner diameter 320). In the example shown, the shaft attaching mechanism 406 includes a polygonal opening sized to receive a shaft such that the shaft may input rotational energy to the gear 400. Shaft attaching mechanism 406 may be constructed of the same intact continuous fiber composite as used to construct the inner portion 302 of the gear body.

Figure 5:
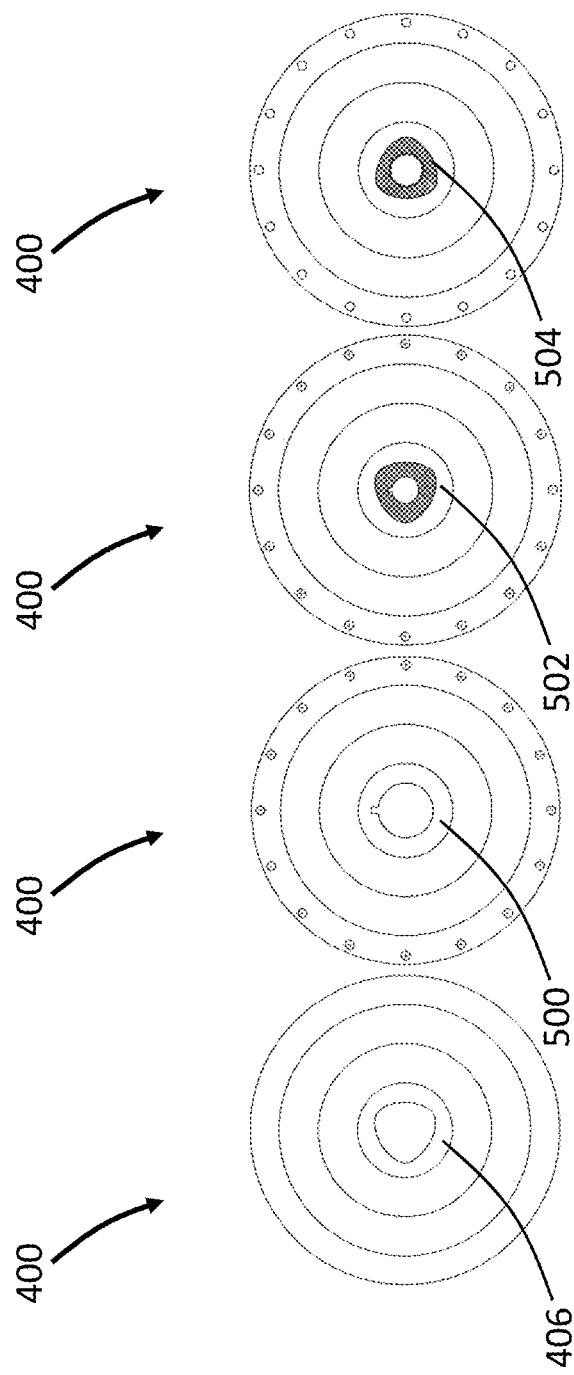
FIGS. 5A-5D are plan views of gears including various attachment mechanisms, according to various example embodiments.

Various alternative shaft attachment mechanisms are envisioned. For example, FIG. 5A depicts an embodiment of the gear 400 that includes the attachment mechanism 406. FIG. 5B depicts an embodiment in which the gear 400 includes an attachment mechanism 500 including a keyway at the inner diameter 320 of gear body 200. The keyway may be shaped to correspond to a protrusion on a shaft such that the shaft interlocks with the gear body 200. FIG. 5C depicts an embodiment in which the gear 400 includes an attaching mechanism 502 including a keyway within a metal insert attached to the gear body 200 (e.g., via an interlocking feature) at the inner diameter 320. In other words, the metal insert includes a central opening including the keyway. FIG. 5D shows an embodiment in which the gear 400 includes a shaft attachment mechanism 504 where a spline is included in the metal insert. Any known shaft coupling mechanism may be employed and either formed directly in the composite material or inside of a metal insert attached thereto.

Second Embodiment

Figure 6:
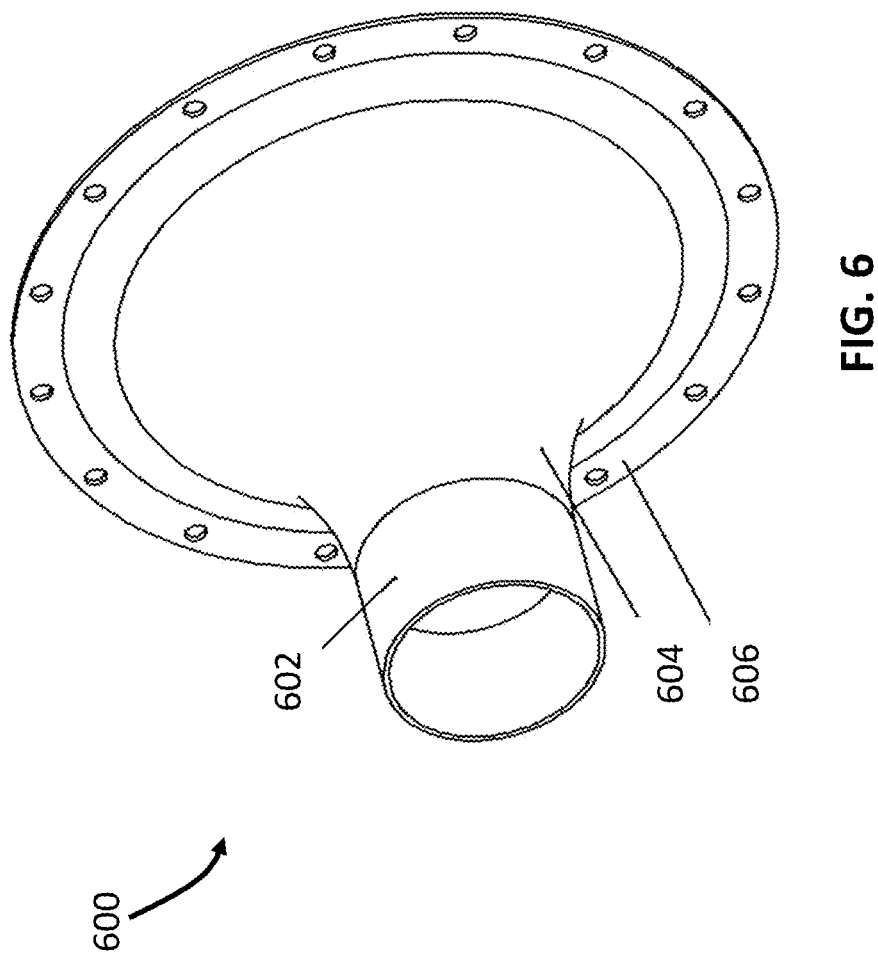
FIG. 6 is a perspective view of a portion of a gear, according to an example embodiment.

FIG. 6 depicts a perspective view of a body 600 of a power transfer structure, according to an example embodiment. In the example shown, the body 600 is in the shape of a variable diameter cylinder having intact continuous fibers from end to end and an integral flange on one or both ends. The body 600 is made by fabricating a braided preform (or a plurality of preforms) approximating a desired shape, transferring each of the preforms to tools having the final cured shape, then placing the preforms and tools into an enclosed mold for resin infusion and cure.

Body 600 may be used to construct any number of power transfer structures. One example of structures that could be fabricated using body 600 is a gear that requires an extended axial portion, such as the left end of FIG. 6, to provide power transfer to a shaft through an attachment feature such as a bearing or spline. A bearing race could be installed on the outer diameter of the of the constant diameter region 602, or a spline could be attached to the inner diameter of the constant diameter region 602.

It should be understood that the structure of the body 600 may vary depending on the implementation. For example, in some embodiments for typical power transfer applications, the body 600 includes three or more continuous fiber layers that extend throughout regions 602, 604, and 606 to provide strength and durability of the structure. It should be understood that, in other implementations, the body 600 may include only a single continuous fiber layer. In some embodiments, additional non-continuous filler layers could be incorporated between the continuous layers within each region 602, 604, and 606 to provide additional stiffness and thickness buildup in those regions as needed for a particular design. The number of intact composite plies, fiber architecture of each ply, and filler material between plies are determined by load requirements for the structure and manufacturability of the preform. In the shown embodiment, the body 600 has multiple intact continuous fiber plies such that there is fiber continuity from the left edge of the structure to the right edge.

As shown, the body 600 includes a constant diameter region 602, a variable diameter region 604, and a flange region 606. In one embodiment, the body 600 may be constructed from a biaxial braded preform. The architecture of such a preform may vary throughout the body 600. For example, in one embodiment, the biaxial fiber ply has a (+45°/−45°) architecture within the constant diameter region 602 to maximize shear strength and stiffness. In some embodiments, the braid angle may increase continuously within the variable diameter region 604. For example, in one embodiment, at a first end of the variable diameter region 604—proximate to the constant diameter region 602—the braid angle is approximately 45°. The braid angle may increase with axial distance from the constant diameter region 602 throughout the variable diameter region 604. For example, in one embodiment, the braid angle increases to about 70° at a second end of the variable diameter region proximate to the flange region 606. The braid angle may increase in any appropriate manner. For example, in one embodiment, the braid angle increases linearly with axial distance from the constant diameter region 602. The braid angle may remain constant within the flange region 606 (e.g., at 70°).

In various implementations of the body 600, the number of intact continuous fiber plies, fiber architecture within each ply, and filler materials between plies are determined by the load requirements for the power transfer structure. The body 600 provides multi-axial load state for the power transfer (rather than simple torsion). Given this, the structure of this embodiment is preferably rigid to prevent misalignment of the structure at interfaces such as gear teeth and bearings. This differs from existing structures having comparable shapes to the structure of this embodiment, which are compliant to allow for at least some misalignment to facilitate torsional load states.

The embodiment shown uses thickness build-up and fiber angle variations to achieve a rigid structure optimized for the dynamic multi-axial load condition applied to the body 600. The thickness build-up is achieved through placement of partial length build-up plies or other filler materials in specific locations between intact continuous composite layers to optimize local strength or stiffness of the structure. Partial length plies could be made using the same composite material used for the continuous plies in body 600 in order to minimize stiffness mismatch between continuous and non-continuous plies. Composite materials using different reinforcement fibers (e.g. alternative grades of carbon fiber, aramid fiber, or glass fiber) could also be used to provide specific benefits such as lower density, lower cost, material damping, and galvanic corrosion resistance. One example of a filler material is a chopped fiber composite that is formable to the required shape.

Alternative structures for the body 600 are envisioned. For example, in one embodiment, the body 600 is fabricated with variable diameter regions and flanges on both ends of the structure. Such a body may include two structures—similar to the body depicted in FIG. 6—attached at the constant diameter regions such that the flanges are outward facing for gear attachment. Using such a structure, rims could be attached to each flange to form a compound gear. Structures of this type could also be attached in series to make compound gears with more than two gear rims. In various other alternative embodiments, the flange angle could also be varied from the 90° angle (from a central axis of the body 600) shown in FIG. 6. to allow for better attachment of various types of gear rims (e.g. double helical, single helical, face gears).

Third Embodiment

Figure 7:
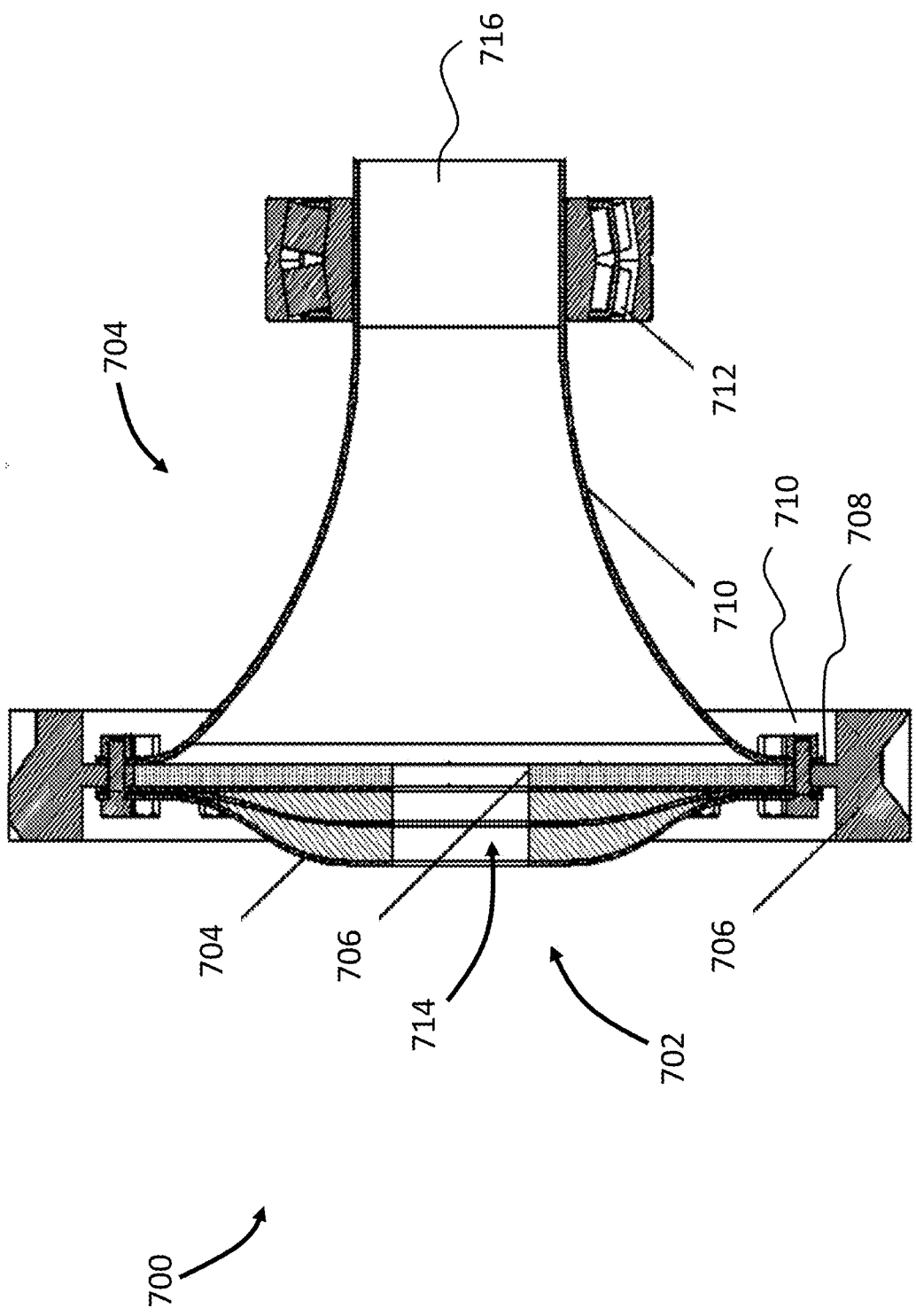
FIG. 7 is a cross-sectional view of a portion of a gear, according to an example embodiment.

Referring now to FIG. 7, an axi-symmetric rotational assembly 700 is shown, according to an example embodiment. The assembly 700 is a combination of the first and second embodiments described herein. As shown, the assembly 700 includes a first power transfer structure 702 and a second power transfer structure 704 interconnected via a steel gear rim 710. An internal flange 712 of the steel gear rim 710 is captured between the first and second power transfer structures 702 and 704 using a bolted attachment 714. It should be noted that other attachment mechanisms may be employed. Adhesive bonding could be used as an alternative attachment mechanism or in combination with the bolted attachment 714. Additional strength near the bolted attachment could be provided by the use of composite material thickness buildup (e.g., via filler layers disposed therebetween) near the bolt holes or bonded metal load spreaders at the bolt holes.

In the example shown, the first power transfer structure 702 includes half of the gear body 200 described with respect to FIGS. 2-3. Varying amounts of filler material are disposed between continuous fiber layers to create a gear body having a thicker inner portion and a thinner outer portion. The second power transfer structure 704 has a substantially similar construction as the body 600 described with respect to FIG. 6.

In the example shown, the assembly 700 includes a polygon opening 718 at a first end to connect with a polygon shaft (not shown). In various alternative embodiments, other shaft connection mechanisms, such as a spline or keyway feature could be used. A second end 720 of the assembly 700 is constrained by a bearing disposed within a bearing race 716. The bearing race 716 is attached to the composite assembly by bonding or other means.

In the example shown, an optional continuous fiber composite plate 708 is attached (e.g. by adhesive bonding or co-curing) to power transfer structure 702. The fiber composite plate 708 has the same thickness as the internal flange 712 of the gear rim 710. The plate 708 can be used to provide a mechanical interlock feature (polygon, lobed, etc.) with the internal flange 712 of the gear rim 710 (e.g., as described in the '157 Patent). The gear rim 710 could be a spur gear, helical gear, face gear, or other gear tooth configuration. Many other gear and gear/shaft configurations can be made by integrating additional power transfer structures and gear rim types. The power transfer structure could also be used for applications other than gears.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that embodiments of the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A gear comprising:
   a rim having an outer circumferential surface and an inner circumferential surface; and
   a composite gear body attached to the inner circumferential surface, the composite gear body including an opening in a central region thereof, wherein the composite gear body comprises:
   a first continuous fiber composite layer extending from a first point on an outer circumferential edge of the composite gear body to a second point at the opening;

a second continuous fiber composite layer extending from the first point to a third point at the opening;

a first filler layer disposed between the first and second continuous fiber composite layers, wherein the filler layer extends within an inner region of the composite gear body, wherein the inner region extends radially between the opening and a boundary inward of the inner circumferential surface such that the composite gear body is thicker within the inner region than the outer circumferential edge; and a second filler layer disposed on the second continuous fiber composite layer, wherein the second filler layer extends within the inner region; and a third continuous fiber composite layer disposed on the second filler layer, wherein the first continuous fiber composite layer is substantially flat and disposed on a central layer of the gear, wherein the second continuous fiber composite layer is disposed on the first filler layer and includes at least two inflection points.

2. The gear of claim 1, wherein the first filler layer includes a contoured region between the boundary and the opening where a thickness of the first filler layer diminishes with radial distance from the opening.

3. The gear of claim 2, wherein, proximate to the opening, the thickness of the first filler layer is substantially constant at a maximal thickness.

4. The gear of claim 1, wherein, outward of the boundary, the first continuous fiber composite layer directly contacts the second continuous fiber composite layer.

5. The gear of claim 1, wherein the first and second continuous fiber composite layers have a tri-axial braid architecture.

6. The gear of claim 5, wherein the first and second continuous fiber composite layers each include a first fiber extending from a point at the opening to the inner circumferential surface in a zero-degree azimuthal direction, a second fiber extending from the point to the inner circumferential surface in a positive sixty-degree azimuthal direction, and a third fiber extending from the point to the inner circumferential surface in a negative sixty-degree azimuthal direction.

7. The gear of claim 1, further comprising a flat spacer layer in a central thickness region of the composite gear, wherein the first continuous fiber composite layer is disposed on the flat spacer layer.

8. The gear of claim 7, wherein the first, second, and third continuous fiber composite layers, and the first and second filler layers are a first composite body disposed on a first side of the flat spacer layer, wherein the gear further comprises a second composite body disposed on a second side of the flat spacer layer, wherein the second composite body comprises a flat continuous fiber composite layer directly contacting the flat spacer layer, a third filler layer disposed on the flat continuous fiber composite layer, a first curved continuous fiber composite layer disposed on the third filler layer, a fourth filler layer directly contacting the first curved continuous fiber composite layer, and a second curved continuous fiber composite layer directly contacting the fourth filler layer.

9. The gear of claim 7, wherein the flat spacer layer is constructed of continuous fiber composite.

10. The gear of claim 9, further comprising a shaft attachment mechanism disposed within the opening.

11. The gear of claim 10, wherein the shaft attachment mechanism is formed within a surface defining the opening and there are no steel components in the gear disposed inward of the rim.

* * * * *